(12) United States Patent
Seo et al.

(10) Patent No.: US 10,899,612 B2
(45) Date of Patent: Jan. 26, 2021

(54) HYDROGEN PRODUCTION REACTOR INCLUDING CARBON MONOXIDE REMOVING UNIT

(71) Applicant: KOREA INSTITUTE OF ENERGY RESEARCH, Daejeon (KR)

(72) Inventors: Dong-joo Seo, Daejeon (KR); Woohyun Kim, Daejeon (KR); Sang-ho Park, Daejeon (KR); Wang-lai Yoon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 527 days.

(21) Appl. No.: 15/700,741

(22) Filed: Sep. 11, 2017

(65) Prior Publication Data
US 2018/0134552 A1    May 17, 2018

(30) Foreign Application Priority Data
Nov. 14, 2016  (KR) .......................... 10-2016-0150791

(51) Int. Cl.
*C01B 3/32* (2006.01)
*B01J 8/06* (2006.01)
(Continued)

(52) U.S. Cl.
CPC .............. *C01B 3/326* (2013.01); *B01J 8/0465* (2013.01); *B01J 8/0469* (2013.01); *B01J 8/0496* (2013.01);
(Continued)

(58) Field of Classification Search
CPC combination set(s) only.
See application file for complete search history.

(56) References Cited

U.S. PATENT DOCUMENTS 5,997,594 A * 12/1999 Edlund ................... C01B 3/503
  48/76
7,494,518 B2 * 2/2009 Reinke ................... F28D 7/024
  48/198.7

(Continued)

FOREIGN PATENT DOCUMENTS

| KR | 10-0314829 B1 | 6/2002 |
| KR | 10-1127688 B1 | 6/2006 |
| KR | 10-2014-0008212 A | 1/2014 |

OTHER PUBLICATIONS

Holladay et al. "Microfuel processor for use in a miniature power supply", Journal of Power Sources, 108, (2002), pp. 21-27.

(Continued)

*Primary Examiner* — Kaity V Chandler
(74) *Attorney, Agent, or Firm* — Birch, Stewart, Kolasch & Birch, LLP (57) ABSTRACT

Provided is a hydrogen production reactor as a reactor producing a reforming gas including hydrogen, in which a burning unit and a reforming unit are sequentially arranged and spaced apart from each other in a concentric structure based on a raw material transfer pipe positioned at a central axis of the reactor, including a heating raw material transfer pipe supplying a raw material to the burning unit, a burning unit burning the supplied raw material and supplying heat to the reforming unit, a reforming raw material phase change pipe positioned within the burning unit and heating the supplied raw material, and a reforming unit reforming the phase-changed raw material supplied from the reforming raw material phase change pipe, wherein the reforming raw material phase change pipe is provided as a coil surrounding an outer circumferential surface of a lower end of the heating raw material transfer pipe.

20 Claims, 5 Drawing Sheets

(51) Int. Cl.

| | |
|---|---|
| *C01B 3/58* | (2006.01) |
| *B01J 23/72* | (2006.01) |
| *B01J 23/42* | (2006.01) |
| *B01J 35/04* | (2006.01) |
| *B01J 8/04* | (2006.01) |
| *B01J 23/40* | (2006.01) |
| *B01J 23/74* | (2006.01) |
| *B01J 35/00* | (2006.01) |

(52) U.S. Cl.
CPC ............... *B01J 8/065* (2013.01); *B01J 8/067* (2013.01); *B01J 23/40* (2013.01); *B01J 23/74* (2013.01); *B01J 35/0006* (2013.01); *C01B 3/583* (2013.01); *C01B 3/586* (2013.01); *B01J 23/42* (2013.01); *B01J 23/72* (2013.01); *B01J 35/04* (2013.01); *B01J 2208/0053* (2013.01); *B01J 2208/00176* (2013.01); *B01J 2208/00203* (2013.01); *B01J 2208/00309* (2013.01); *B01J 2208/00504* (2013.01); *B01J 2208/065* (2013.01); *C01B 2203/0233* (2013.01); *C01B 2203/044* (2013.01); *C01B 2203/047* (2013.01); *C01B 2203/0445* (2013.01); *C01B 2203/0811* (2013.01); *C01B 2203/1011* (2013.01); *C01B 2203/1052* (2013.01); *C01B 2203/1064* (2013.01); *C01B 2203/1076* (2013.01); *C01B 2203/1223* (2013.01); *C01B 2203/1229* (2013.01); *C01B 2203/1288* (2013.01)

(56) References Cited

U.S. PATENT DOCUMENTS

| | | | | |
|---|---|---|---|---|
| 8,173,082 B1* | 5/2012 | Wangerow | ............. | B01J 8/0465 422/600 |
| 2002/0136677 A1* | 9/2002 | Sederquist | ............... | B01J 8/062 48/127.9 |
| 2003/0161768 A1* | 8/2003 | Kawamoto | ............ | B01J 8/0496 422/610 |
| 2004/0068933 A1* | 4/2004 | Nakamura | ................ | C01B 3/48 48/127.9 |
| 2004/0144029 A1* | 7/2004 | Miura | .................... | B01J 8/0465 48/127.9 |
| 2004/0187386 A1* | 9/2004 | Wangerow | ............. | C01B 3/384 48/198.3 |
| 2004/0223908 A1* | 11/2004 | Holladay | ................ | C01B 3/323 423/648.1 |
| 2006/0107594 A1* | 5/2006 | Kuwaba | ................... | C01B 3/583 48/61 |
| 2006/0150509 A1* | 7/2006 | Suzuki | ................... | B01J 8/0403 48/127.9 |
| 2007/0006529 A1* | 1/2007 | Wunning | ................ | B01J 8/0469 48/198.7 |
| 2007/0028522 A1* | 2/2007 | Mizusawa | ............. | B01J 8/0469 48/127.9 |
| 2007/0104625 A1* | 5/2007 | Su | .......................... | B01J 8/0453 422/618 |
| 2009/0087705 A1* | 4/2009 | Fuju | .................... | H01M 8/0631 429/424 |
| 2009/0317671 A1* | 12/2009 | Ukai | ...................... | B01J 8/0496 429/425 |
| 2010/0055030 A1* | 3/2010 | Matsuda | ................. | C01B 3/384 423/655 |
| 2011/0117461 A1* | 5/2011 | Maenishi | ................. | B01J 8/0469 429/425 |
| 2012/0014850 A1* | 1/2012 | Son | .......................... | C01B 3/34 422/608 |
| 2018/0115004 A1* | 4/2018 | Woo | .................. | H01M 8/04738 |

OTHER PUBLICATIONS

Office Action dated Nov. 14, 2017, in Korean Patent Application No. 10-2016-0150791.

\* cited by examiner

HYDROGEN PRODUCTION REACTOR INCLUDING CARBON MONOXIDE REMOVING UNIT

CROSS-REFERENCE TO RELATED APPLICATIONS

This application claims priority under 35 U.S.C. § 119 to Korean Patent Application No. 10-2016-0150791, filed on Nov. 14, 2016, in the Korean Intellectual Property Office, the disclosure of which is incorporated herein by reference in its entirety.

TECHNICAL FIELD

The following disclosure relates to a hydrogen production reactor for producing hydrogen which may be supplied to a fuel cell, or the like, by reforming a carbon compound and converting the same into a reformed gas including hydrogen. More particularly, the following disclosure relates to a hydrogen production reactor which vaporizes a liquid raw material as a mixture of a carbon compound and water, converting the same into a reformed gas including hydrogen through a contact reaction with a catalyst in a reforming unit filled with the catalyst, positioning a burning unit in an adjacent flow channel separated from the reforming unit to accelerate a reaction, supplying heat obtained by causing a partial amount of the liquid raw material to undergo a combustion reaction under a catalyst, as heat of reaction to the reforming unit, and increasing a conversion rate by including a carbon monoxide removing unit at an end of the reforming unit.

BACKGROUND

Recently, as an interest in environmental issues has increased, interest in and demand for clean fuel using hydrogen as fuel have grown. A polymer fuel cell system is a highly efficient generating device which has a low operating temperature and which can be rapidly started, and thus, the polymer fuel cell system may be utilized as a power supply device in various fields when associated with an appropriate hydrogen supply device.

A carbon compound including methanol is fuel which does not have a sulfuric component, has a molecular structure with high hydrogen/carbon-ratio characteristics, is easily mixed with water, and has high energy density in a liquid phase at room temperature and normal pressure so as to be easily stored. In order to produce hydrogen from a carbon compound, a vapor reforming method has been widely used.

In order to perform a vapor reforming reaction from a carbon compound, first, a vaporizer for vaporizing a mixture of the carbon compound in a liquid state and water, a combustor for supplying heat to a reforming reactor, and a vaporizer for vaporizing combustion liquid fuel are required, and in the case of supplying to a polymer fuel cell vulnerable to carbon monoxide, like a polymer fuel cell, a purifier is additionally required to remove carbon monoxide.

For example, a reaction to produce hydrogen from methanol is made as expressed by Reaction Formula 1.

[Reaction Formula 1]

$$CH_3OH+H_2O=CO_2+3H_2 \Delta H=49.4 \text{ kJ/mol} \quad (1)$$

$$CH_3OH=CO+2H_2 \Delta H=90.5 \text{ kJ/mol} \quad (2)$$

$$CO+H_2O=CO_2+H_2 \Delta H=-41.1 \text{ kJ/mol} \quad (3)$$

The reforming reaction using methanol is performed as (1) of the Reaction Formula 1, and at the same time, a reaction of (2) is partially made at high temperatures. The reactions (1) and (2) are endothermic reactions, and in order to allow these reactions to smoothly be carried out, heat is required to be continuously supplied and adjustment of a temperature of a catalyst at which the reforming reaction takes place is required to be essentially accompanied to adjust a reaction speed. Also, if a temperature of the reactor in the reaction (2) is too high, a methanol direct decomposition reaction and a reverse reaction of the foregoing reaction (3) may be carried out to increase a concentration of carbon monoxide in a product, and if the temperature is too low, vapor may be condensed to degrade a reaction speed of a catalytic layer to reduce conversion capacity of the methanol fuel, and thus, a temperature of the reforming unit is required to be accurately maintained.

In order to solve the problem, Korean Patent Registration No. 10-0314829 discloses a methanol reforming apparatus having dual-tube to uniformly maintain a temperature of a reformer. However, since the reactor is large on the whole, the combustion catalyst is not entirely in contact with a side surface of the reforming catalyst, and the combustion catalyst is distributed to fill several portions, rather than filling one tube, it is difficult to effectively supply heat to the reforming unit.

Also, J. of Power Source, 108 (2002) 21-27, paper of Pacific North National Laboratory, describes a small methanol vapor reforming apparatus using methanol as both combustion fuel and a reforming raw material. This apparatus, however, has an output as low as about 200 mW and a large amount of methanol as fuel is applied to a combustor to maintain a reaction temperature, obtaining very low overall heat efficiency standing at 5% to 10%.

Thus, research and development of a hydrogen production reactor capable of remarkably enhancing heat efficiency and reaction conversion rate, at a minimized size, are required.

PRIOR ART DOCUMENT

Patent Document

Korean Patent Registration No. 10-0314829 (Nov. 2, 2001)

Non-Patent Document

Pacific North National Laboratory, J. of Power Source, 108 (2002) 21-27

SUMMARY

An exemplary embodiment of the present invention is directed to providing a hydrogen production reactor which is capable of maximizing energy efficiency required for the inside of the reactor, which can be simply manufactured to be compact, and which is capable of producing hydrogen from a carbon compound.

Another exemplary embodiment of the present invention is directed to providing a hydrogen production reactor which is capable of carrying out a reforming reaction rapidly and stably implementing a high conversion rate by remarkably improving evaporation efficiency of a reforming raw material phase change pipe for changing a phase of a reforming raw material.

Another exemplary embodiment of the present invention is directed to providing a hydrogen production reactor which does not degrade a polymer fuel cell although fuel is supplied to the fuel cell, by effectively removing carbon monoxide contained in a gas including abundant hydrogen generated from a carbon compound.

In one general aspect, a hydrogen production reactor for producing hydrogen from a carbon compound is provided. The hydrogen production reactor as a reactor producing a reformed gas including hydrogen from a raw material containing a carbon compound and water, in which a burning unit and a reforming unit are sequentially arranged and spaced apart from each other in a concentric structure based on a raw material transfer pipe positioned at a central axis of the reactor, includes: a heating raw material transfer pipe supplying a raw material to the burning unit; a burning unit burning the supplied raw material and supplying heat to the reforming unit; a reforming raw material phase change pipe positioned within the burning unit and heating the supplied raw material; and a reforming unit reforming the phase-changed raw material supplied from the reforming raw material phase change pipe, wherein the reforming raw material phase change pipe is provided as a coil surrounding an outer circumferential surface of a lower end of the heating raw material transfer pipe.

The reforming unit may have, at an end thereof, a carbon monoxide removing unit filled with a carbon monoxide removing catalyst for removing carbon monoxide from a product reformed and produced from the supplied raw material.

The carbon monoxide removing catalyst may include one or more metals selected from among gold, silver, iron, cobalt, nickel, copper, manganese, aluminum, zinc, titanium, hafnium, rhodium, ruthenium, osmium, iridium, palladium, platinum, zirconium, and lanthanide metals, or an oxide thereof.

A first housing, a second housing, and the heating raw material transfer pipe may be sequentially positioned and spaced apart from each other from an outer side in a concentric structure, and the reforming unit provided in a space between the first housing, the second housing may have a reforming catalyst, and the burning unit provided in a space between the second housing and the heating raw material transfer pipe may have a combustion catalyst.

The reforming catalyst and the combustion catalyst may independently include one or more metals selected from among gold, silver, iron, cobalt, nickel, copper, manganese, aluminum, zinc, titanium, hafnium, rhodium, ruthenium, osmium, iridium, palladium, platinum, zirconium, and lanthanide metals, or an oxide thereof.

The reforming catalyst may include one or more selected from among a copper/cerium oxide/zirconium oxide complex, a copper/zinc oxide/aluminum oxide complex, a copper/cerium oxide/aluminum oxide complex, and a copper/zirconium oxide/aluminum oxide complex.

A lower end of the heating raw material transfer pipe and a lower end of the second housing may be spaced apart from each other to form a first compartment, and a lower end of the second housing and a lower end of the first housing may be spaced apart from each other to form a second compartment.

The reactor may further include: a horizontal separator provided at an upper end of the heating raw material transfer pipe and separating the heating raw material transfer pipe, the first housing, and the second housing from the outside.

The horizontal separator may be provided such that the heating raw material supply pipe, a combustion product discharge pipe, the reforming raw material supply pipe, and a reforming raw material discharge pipe penetrate therethrough.

The heating raw material supply pipe may be connected to the heating raw material transfer pipe, the combustion product discharge pipe may be connected to the burning unit, and the reforming raw material supply pipe and the reforming raw material discharge pipe may be connected to one end and the other end of the reforming raw material phase change pipe, respectively.

The reforming raw material discharge pipe may be connected to the second compartment, may be connected to a pre-heating pipe, and may surround in a coil form an outer circumferential surface of the first housing.

The first housing may further include at least one temperature measurement sensor provided in a portion of an outer circumferential surface thereof filled with the reforming catalyst.

The burning unit may further include a heat conduction mesh in a space not filled with the combustion catalyst.

The reforming unit may further include at least one heat transfer fin.

The raw material may be stored in a raw material tank and may include a heating raw material supplied from the raw material tank to the heating raw material supply pipe and a reforming raw material supplied from the raw material tank to the reforming raw material supply pipe.

In another general aspect, there is provided a method for producing hydrogen using the aforementioned hydrogen production reactor, in which a heating raw material flows by including:

a) an operation of transferring the heating raw material to the heating raw material transfer pipe through the heating raw material supply pipe;

b) an operation of transferring the heated raw material from the heating raw material transfer pipe to the burning unit through the first compartment and causing the heated raw material to react with the combustion catalyst filling the burning unit to perform catalyzed combustion; and c) an operation of discharging a combustion product to the outside of the reactor through the combustion product discharge pipe after catalyzed combustion, and a reforming raw material flows by including:

1) an operation of transferring the raw material to be reformed to the reforming raw material phase change pipe through the reforming raw material supply pipe and subsequently changing a phase of the raw material to be reformed to a gas phase;

2) an operation of transferring the phase-changed raw material to the second compartment through the reforming raw material discharge pipe and the pre-heating pipe;

3) an operation of letting the reformed raw material supplied to the second compartment to pass through the reforming unit to react with the reforming catalyst filling the reforming unit;

4) an operation of letting the reformed raw material to pass through the carbon monoxide removing catalytic layer of the carbon monoxide removing unit at an end of the reforming unit to selectively remove carbon monoxide; and 5) an operation of discharging a reaction-finished product to the outside of the reactor.

The heated raw material or the reformed raw material may include 30 to 50 wt % of water and 50 to 70 wt % of a carbon compound, and in operation 3), the reforming catalyst may be maintained within a temperature range of 100° C. to 300° C. Also, in operation 4), the carbon monoxide removing catalytic layer may have a temperature range of 200° C. to 300° C.

The hydrogen production reactor according to the present invention may easily adjust thermal gradient using the combustion catalyst of the burning unit and the reforming catalyst of the reforming unit, minimize energy consumption according to a reaction. In particular, the hydrogen production reactor according to the present invention may remarkably enhance conversion efficiency of a reaction product by maximizing evaporation efficiency when a reforming raw material is changed in phase.

Also, the hydrogen production reactor according to the present invention may effectively remove carbon monoxide, whereby a polymer fuel cell, a supply target of produced hydrogen may be stably used.

Also, the hydrogen production reactor according to the present invention may facilitate an initial reaction and may be compact in size.

Also, the hydrogen production reactor according to the present invention may be extensively used for backup power or as a substitute of a lead storage battery in various fields having difficulty in power supply, as well as in a general energy system using hydrogen as fuel, such as a fuel cell, or the like.

Other features and aspects will be apparent from the following detailed description, the drawings, and the claims.

DETAILED DESCRIPTION OF EMBODIMENTS

Hereinafter, a hydrogen production reactor for producing hydrogen from a carbon compound according to the present invention will be described with reference to the accompanying drawings and specific examples. However, the following specific examples and exemplary embodiments are merely illustrative to describe the present invention in detail and the present invention is not limited thereto and may be implemented in various forms.

Also, unless otherwise defined, all the technical terms and scientific terms have the same meaning as those generally understood by a person skilled in the art. Terms used in the present disclosure are used to merely effectively describe specific examples, without intending to limit the present invention.

Also, the drawings presented hereinafter are provided as examples to sufficiently transfer the technical concept of the present invention. Thus, the present invention is not limited to the drawings presented hereinafter and may be embodied in a different form, and the drawings present hereinafter may be exaggerated to be illustrated to clarify the technical concept of the present invention. Also, like numbers refer to like elements throughout the specification.

Also, as used herein, the singular forms used in the specification and claims are intended to include the plural forms as well, unless the context clearly indicates otherwise.

Figure 1:
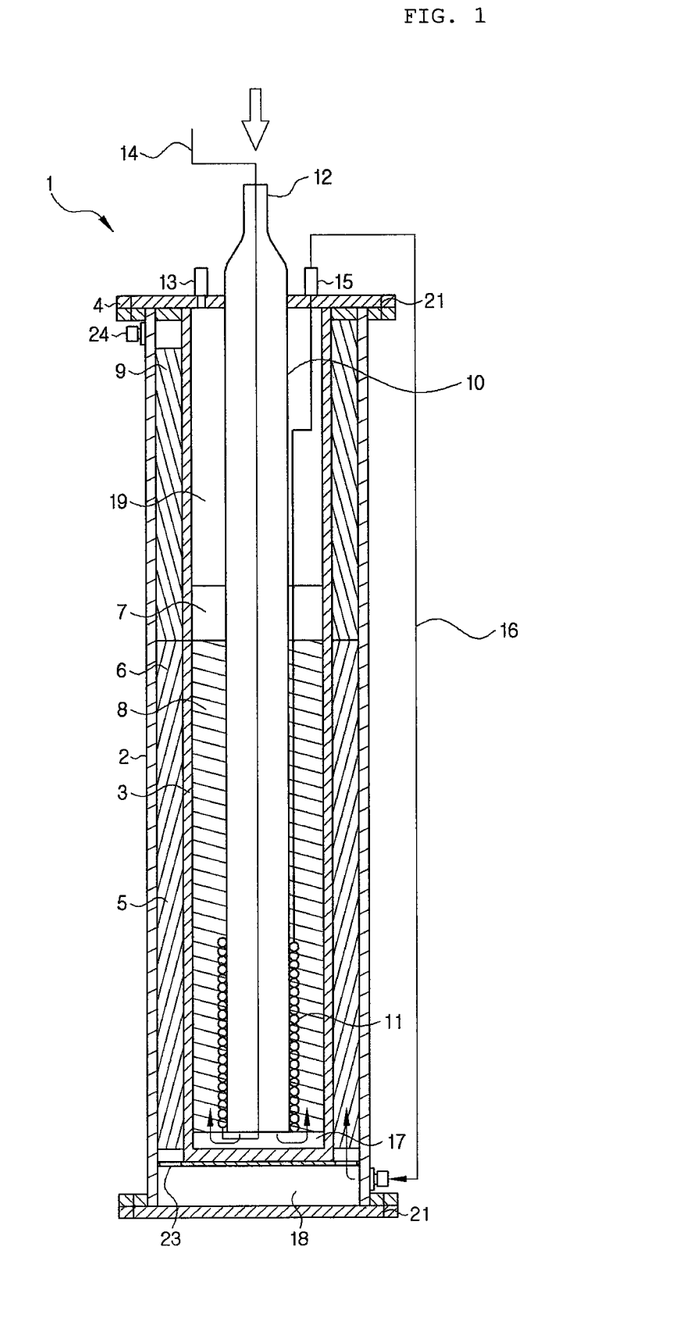
FIG. 1 is a cross-sectional view of a reactor according to an exemplary embodiment.

Referring to a reactor of the present invention, one end of the reactor where a reforming raw material supply pipe is positioned in FIG. 1 will be referred to as a "lower end", and the other end opposing the lower end will be referred to as an "upper end". In addition, a lower end and an upper end of each of a first housing, a second housing, and a raw material transfer pipe, as well as the reactor, may also be defined in the same manner.

A term "concentric axis" refers to an axis connecting a center of a figure formed by the first housing, the second housing, and the raw material transfer pipe when the reactor is viewed in a direction in which a raw material is introduced to the reactor. Here, a center of the figure refers to the center of gravity, and the first housing, the second housing, and the raw material transfer pipe may have the same or different shapes. Also, with respect to a direction perpendicular to the concentric axis, a direction opposite to the concentric axis in the first housing, the second housing, and the raw material transfer pipe refers to the inside and an opposite direction thereof refers to the outside.

The term "raw material" used in this disclosure generally refers to a liquid phase or a gas phase material including a carbon compound and water and is stored in a raw material tank. The raw material may include a "heating raw material" supplied from the raw material tank to the heating raw material supply pipe and a "reforming raw material" supplied from the raw material tank to the reforming raw material supply pipe. Also, the raw material to be heated and the raw material to be reformed may have the same or different composition ratios and the present invention is not limited thereto.

Figure 2:
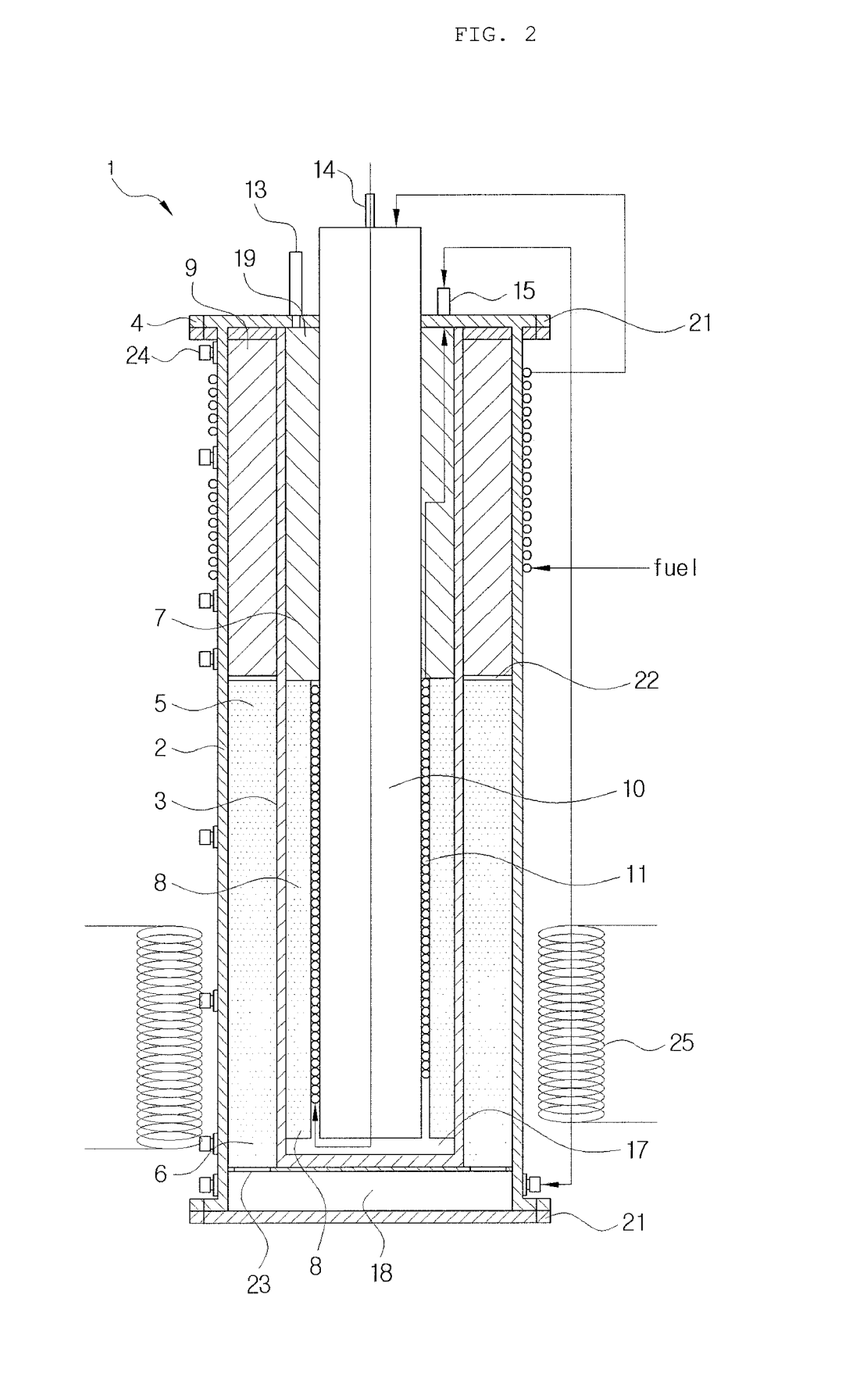
FIG. 2 is a cross-sectional view of a reactor having a heater on an outer side according to an exemplary embodiment.

FIGS. 1 and 2 are cross-sectional views of a hydrogen production reactor according to an exemplary embodiment of the present invention. As illustrated in FIG. 1, the reactor according to an exemplary embodiment of the present invention includes a heating raw material transfer pipe provided at the center and the first housing, the second housing, and the heating raw material transfer pipe sequentially provided from an outer side, having a concentric structure. The first housing, the second housing, and the heating raw material transfer pipe are spaced apart from each other and a reforming raw material phase change pipe is provided therein. Accordingly, raw material transfer, phase change, reforming, and combustion reaction may be simultaneously carried out within the single reactor.

Figure 6:
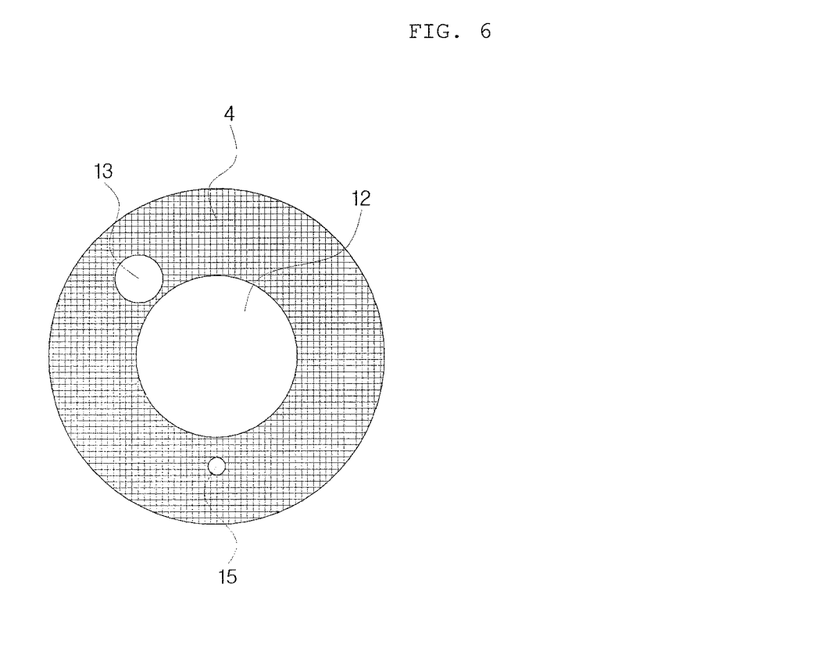
FIG. 6 is a plan view of a horizontal separator.

In detail, the reactor 1 according to the present invention is hermetically closed by a first housing 2 and a horizontal separator 4 and includes a second housing 3, a heating raw material transfer pipe 10, and a reforming raw material phase change pipe 11 therein. Also, a heating raw material supply pipe 12, a combustion product discharge pipe 13, and a reforming raw material discharge pipe 15 penetrate through the horizontal separator 4 (refer to FIG. 6) to supply a raw material to be reformed or raw material to be heated to the inside of the reactor 1 from the outside or discharge a post-reaction product from the inside of the reactor 1 to the outside. Apart from this, the reforming raw material supply pipe 14 is connected to the reforming raw material phase change pipe 11 through the inside of the heating raw material supply pipe 12.

The heating raw material supply pipe 12 serves to transfer a raw material to be heated to the heating raw material transfer pipe 10, and the heated raw material may undergo a catalyzed combustion reaction, while passing through a combustion catalyst 8 filling the inside of a burning unit 7, and after the catalyst combustion, a product is discharged to the outside of the reactor 1 through the combustion product discharge pipe 13.

Also, apart from the raw material to be heated supplied to the heating raw material transfer pipe 10, a raw material to be reformed is supplied to the reforming raw material phase change pipe 11 through the reforming raw material supply pipe 14. Here, the reforming raw material phase change pipe 11 is positioned in contact with an outer circumferential surface of the heating raw material transfer pipe 10 and has a coil shape surrounding an outer circumferential surface of a lower end of the heating raw material transfer pipe 10. Here, the "lower end", which follows classification of the heating raw material transfer pipe into an upper end and a lower end, refers to a portion of the burning unit 7 corresponding to a height filled with the combustion catalyst. Preferably, a range from a bottom of the heating raw material transfer pipe 10 to a position corresponding to ½ height may be set to the lower end, and the range may be adjusted in consideration of a height filled with the combustion catalyst, a diameter of a tube of the reforming raw material phase transfer pipe, a supply amount of a raw material, and the like. That is, the reforming raw material phase change pipe 11 is positioned to a height of a position adjacent to the lower end portion of the burning unit 7 filled with the combustion catalyst, a lower end of the heating raw material transfer pipe 10 such that heat generated as heating fuel reacts to a combustion catalyst of the burning unit 7 is directly transferred to change phase. Accordingly, reaction heat generated during a burning process may be immediately transferred to phase change to start a combustion reaction and evaporate a reformed raw material, evaporation efficiency may be enhanced, and heat may be continuously supplied to the inside of the reactor 1 and the raw material heated to have high temperatures is supplied to an inlet of a reformed catalytic layer to complement insufficient heat.

The raw material to be reformed which has passed through the reforming raw material phase change pipe 11 may be released to the outside of the reactor 1 through the reforming raw material discharge pipe 15 and transferred to a second compartment 18. The transferred raw material to be reformed supplied to the second compartment 18 is converted into a reformed gas with rich hydrogen, while passing through a reforming catalyst 6 stacked within a reforming unit 5. Here, the hydrogen-rich reformed gas contains carbon monoxide, and thus, after passing through the reforming catalyst, carbon monoxide of the reforming raw material may be removed through a carbon monoxide removing unit 9 provided at an end of the reforming unit. The carbon monoxide removing unit 9 has a catalyst for removing carbon monoxide, and a method for removing carbon monoxide is not limited, but, preferably, a selective methanation reaction as expressed by Reaction formula 2 is carried out.

[Reaction Formula 2]

$CO+3H_2 \rightarrow CH_4+H_2O$ (Heat generation, methanation of carbon monoxide) (4)

$CO_2+4H_2 \rightarrow CH_4+2H_2O$ (Heat generation, methanation of carbon dioxide) (5)

$CO_2+H_2 \rightarrow CO+H_2O$ (Heat absorption, shift reaction of reverse water gas) (6)

In Reaction Formula 2, reaction (4) shows a main reaction in which carbon monoxide is methanated and heat is generated from a catalytic layer due to the reaction. Meanwhile, reactions (5) and (6) show sub-reactions, and in the case of reaction (6), a reverse water gas shift reaction may occur as a heat absorption reaction. Thus, a considerable amount of reaction heat may be generated in the carbon monoxide removing unit, and thus, as a temperature of the catalytic layer is increased, sub-reactions (5) and (6) may be simultaneously carried out and a methanation transfer rate and selectivity of carbon monoxide may be lowered.

The catalytic layer of the carbon monoxide removing unit may be maintained in a temperature range from 200° C. to 300° C. When the range is met, a methanation transfer rate of carbon monoxide may be high and a reaction catalyst within the carbon monoxide removing unit 9 may be stably used for a long period of time. A method for maintaining the temperature range is not limited but internal heat may be used or an external unit for maintaining temperature may be separately provided.

In the present invention, the first housing 2 and the second housing 3 are formed of a metal, have a concentric axis, and are spaced apart from each other to form the reforming unit 5. The reforming unit 5 is a region in which a raw material to be reformed is converted into a reformed gas including hydrogen according to a reforming reaction, and a portion of the reforming unit 5 may be filled with a reforming catalyst 6. In the drawing, it appears that the reforming catalyst 6 filling the reforming unit 5 is at the same position as that of the reforming unit 5, but the present invention is not limited thereto and it should be understood that the reforming unit is filled with the reforming catalyst 6. Also, the reforming unit 5 is generally called in association with the carbon monoxide removing unit 9 at an upper end.

The first housing 2 may have a diameter greater than that of the second housing 3 and surround side surfaces of the second housing 3 such that the second housing 3 is completely blocked from the outside. A portion of the side surface of the second housing 3 may be surrounded by the reforming catalyst 6.

The aforementioned carbon monoxide removing unit 9 and a reformed generation gas discharge pipe 24 for discharging a raw material to be reformed may be provided at an upper end of the reforming unit 5 as a downstream part.

In the reactor 1, the second compartment 18 may be provided in a space between a lower end of the first housing 2 and a lower end of the second housing 3. The second compartment 18 may serve as a flow channel receiving gas phase reformed fuel and transferring the gas phase reformed fuel to the reforming unit 5.

The reforming unit 5 may have a punched guide plate 23 provided at a lower end thereof to allow the reforming catalyst 6 to be easily provided thereto. The punched guide plate 23 may serve to provide a gap between the reforming unit 5 and the second compartment 18, as well as prevent the reforming catalyst 6 from being dropped or scattered to the second compartment 18. Also, the punched guide plate 23 may have a mesh form or a hollow shape to allow the reforming raw material to be easily introduced to the reforming unit 5 but the present invention is not limited thereto.

The reforming catalyst 6 fills the reforming unit 5, starting from a lower end of the reforming unit 5, and preferably fills the reforming unit 5 such that the reforming catalyst 6 is spaced apart from an upper end of the reforming unit 5, from the punched guide plate 23 as a starting point. More preferably, in adjacent to the combustion catalyst, the reforming catalyst 6 may be in a position where a filling height is equal to or higher than that of the combustion catalyst. Also, the filling height may be adjusted in consideration of the carbon monoxide removing unit 9 positioned at an end of the reforming unit 5.

The reforming catalyst 6 may include one or more metals selected from among gold, silver, iron, cobalt, nickel, copper, manganese, aluminum, zinc, titanium, hafnium, rhodium, ruthenium, osmium, iridium, palladium, zirconium, and lanthanide metals, or an oxide thereof, but the present invention is not limited thereto. In a specific example, the reforming catalyst 6 may include one or more selected from among a copper/cerium oxide/zirconium oxide complex, a copper/zinc oxide/aluminum oxide complex, a copper/cerium oxide/aluminum oxide complex, and a copper/zirconium oxide/aluminum oxide complex. Preferably, a complex obtained by synthesizing a copper:zinc:aluminum oxide by a weight ratio of 3 to 5:3 to 5:1 to 3 through coprecipitation method may be used.

A carbon monoxide removing catalyst provided within the carbon monoxide removing unit 9 may include one or more metals selected from among gold, silver, iron, cobalt, nickel, copper, manganese, aluminum, zinc, titanium, hafnium, rhodium, ruthenium, osmium, iridium, palladium, zirconium, and lanthanide metals, or an oxide thereof.

In the present invention, the heating raw material transfer pipe 10 may be positioned on an inner side of the housing 3 and have a concentric axis with the first housing 2 and the second housing 3. Also, the second housing 2 and the heating raw material transfer pipe 10 may be spaced apart from each other to form the burning unit 7, and the burning unit 7 may be filled with a combustion catalyst 8.

The burning unit 7 burns a raw material to be heated by a catalyzed combustion reaction to convert the heating raw material to heat energy and a product of combustion. A portion of the burning unit may be filled with a combustion catalyst and may be connected to the heating raw material transfer pipe 10 through the first compartment 17 at a lower end thereof so as to be provided with a raw material to be heated. Also, an upper end of the burning unit 7 in contact with the horizontal separator 4 may be connected to a combustion product discharge pipe 13 provided through the horizontal separator 4.

The combustion catalyst 8 may be adjusted in a filling position and a filling amount according to a reforming reaction temperature range and a temperature gradient of the reforming unit 5. Also, in order to increase evaporation efficiency of the reforming raw material, preferably, the combustion catalyst 8 may be adjacent to the reforming raw material phase change pipe 11 and transfer heat generated according to initiation of a combustion reaction to the reforming raw material phase change pipe 11.

Like the reforming catalyst or the carbon monoxide removing catalyst, the combustion catalyst 8 may include one or more metals selected from among gold, silver, iron, cobalt, nickel, copper, manganese, aluminum, zinc, titanium, hafnium, rhodium, ruthenium, osmium, iridium, palladium, zirconium, and lanthanide metals, or an oxide thereof, and preferably, may be selected from the group consisting of platinum metals such as platinum, rhodium, ruthenium, osmium, iridium, palladium, and the like, gold, silver, and bronze, or a mixture of two or more thereof.

Also, the combustion catalyst 8 may be held in a support so as to be used, and the support may be formed of one or more selected from the group consisting of an aluminum oxide, an α-aluminum oxide, a zirconium oxide ($ZrO_2$), and silica ($SiO_2$), or a mixture of two or more thereof. Also, physical properties of the support such as a particle form, a size, and the like, are not limited and may be freely adjusted to be used within the scope not impairing the object of the present invention.

Also, the combustion catalyst 8 may be adjusted in loading rate of a metal or a metal oxide according to a temperature gradient of the reforming unit 5. That is, after the catalyzed combustion reaction, a temperature of the reforming unit is measured, and here, if a temperature required for a reaction is not secured, a loading rate of a metal or a metal oxide of the combustion catalyst may be increased, and a portion of the reforming unit 5 having a low temperature may be concentratedly filled with the combustion catalyst having a high loading rate to adjust a temperature required for a reforming reaction.

In order to more effectively transfer heat generated by the catalyzed combustion reaction in addition to the combustion catalyst, the burning unit 7 may employ a heat conduction mesh 19. The heat conduction mesh 19 may be formed by extracting a metal having high heat conductivity, e.g., gold, silver, copper, or aluminum in a fibrous form and weaving the same. In this manner, a reaction product produced after the catalyzed combustion reaction may be rapidly discharged to the outside of the reactor 1 and heat, which has not been transferred yet, may be transferred to the reforming unit 5 to increase energy efficiency.

The heat conduction mesh 19 may be positioned in a portion of the burning unit 7 which is not filled with the combustion catalyst 8, and preferably, the heat conduction mesh 19 may be positioned in a portion of the burning unit 7 where the raw material phase change pipe is positioned, to surround the raw material phase change pipe.

The heating raw material transfer pipe 10, which serves to transfer heated fuel introduced from the outside to the burning unit 7, may be formed of a material the same as or different from that of the first housing 2 or the second housing 3. Also, a lower end of the heating raw material transfer pipe 10, a lower end of the burning unit 7, and a lower end of the second housing 3 may be spaced apart from each other to form the first compartment 17.

Figure 3:
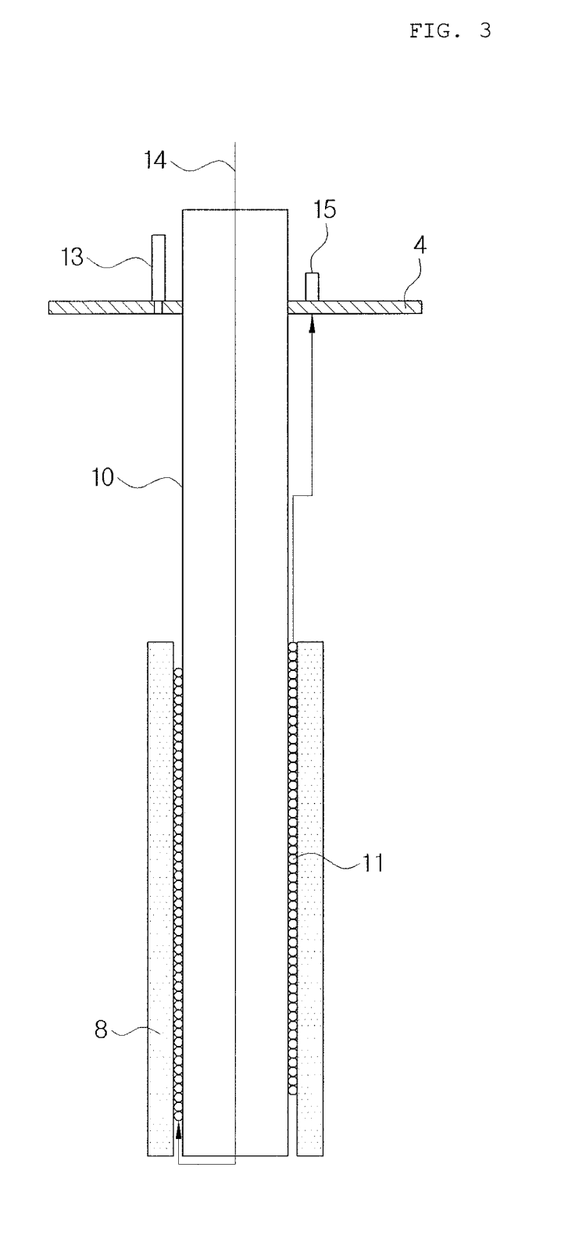
FIG. 3 is a view illustrating a combustion catalyst of a burning unit and a reforming raw material phase change pipe within a reactor.
Figure 4:
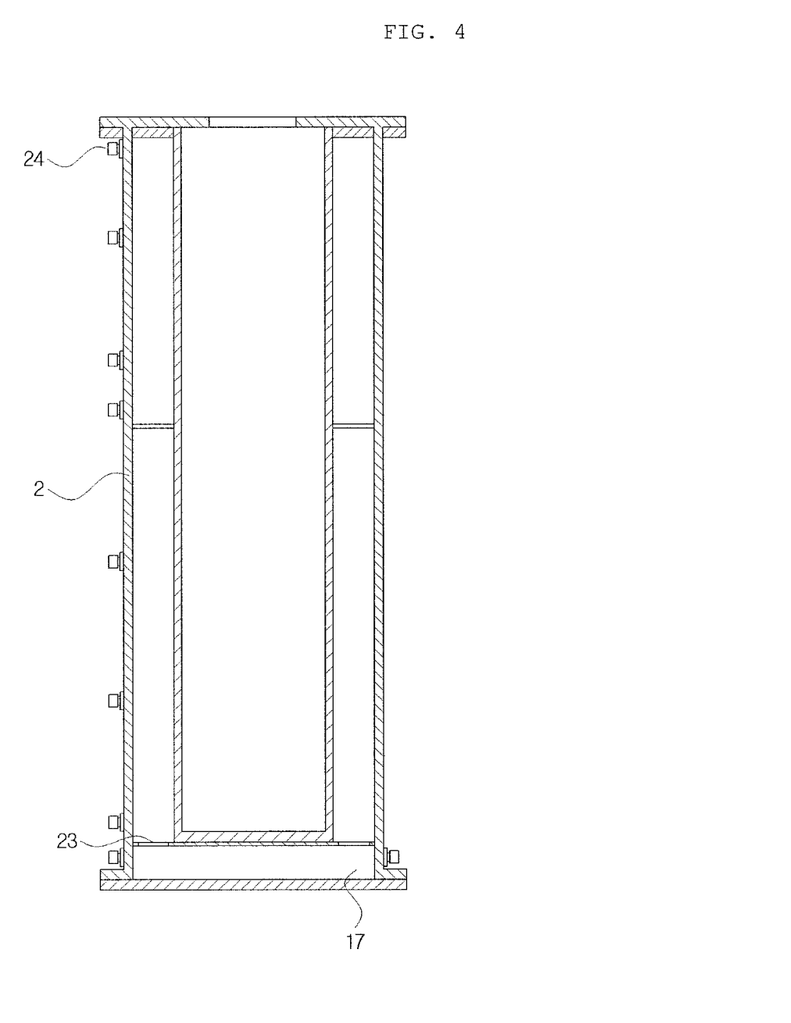
FIG. 4 is a cross-sectional view of a reactor without a heating raw material transfer pipe.

In the present invention, the reforming raw material phase change pipe 11 is introduced to change the reforming raw material from a gas phase to a liquid phase, and as illustrated in FIGS. 1 to 3, the reforming raw material phase change pipe 11 may surround, in a coil form, an outer circumferential surface of the lower end portion of the heating raw material transfer pipe 10.

The reactor 1 according to the present invention may further include a heater 25 to facilitate initial starting of the reforming raw material phase change pipe 11 through pre-heating, as well as pre-heating the catalytic layer of the reforming unit 5. The heater 25 may include any one selected from an external jacket or a band type installed on the outside of the reactor 1, a coil installed within the reactor 1, an internal pipe type heat-exchanged by installing a pipe, or a combination thereof and is not limited thereto. As illustrated in FIG. 2, the heater 25 may be provided on an outer side of the reforming unit 5 filled with the reforming catalyst 6, and in order to effectively supply heat, a position of the heater 25 is not limited. Also, the heater 25 serves to enhance a starting speed and operates only at the initial starting. When a reformed gas is generated and a selective methanation reaction is carried out, a heating reaction is made, and thus, an operation of the heater 25 is preferably stopped.

In the present invention, the horizontal separator 4 serves to block the first housing 2, the second housing 3, and the heating raw material transfer pipe 10 from the outside, and the heating raw material supply pipe 12, the combustion product discharge pipe 13, and the reforming raw material discharge pipe 15 penetrate through the horizontal separator 4 in a direction parallel to the concentric axis.

In the present invention, the horizontal separator 4 may be attached to the first housing 2 through a flange 21. Accordingly, there is no need for the horizontal separator 4 to be separately attached to the second housing 3 or the heating raw material transfer pipe 10, shortening an assembly time.

In the present invention, the heating raw material supply pipe 12 may be connected to the heating raw material transfer pipe 10, the combustion product discharge pipe 13 may be connected to the burning unit 7, and the reforming raw material supply pipe 14 and the reforming raw material discharge pipe 15 may be connected to one end and the other end of the reforming raw material phase change pipe 11, respectively. Each of the pipes is connected to the inside of the reactor 1 to induce a heating raw material, a reforming raw material, and a post-reaction product to be effectively supplied and discharged.

Also, in the present invention, in order to more effectively adjust a temperature gradient of the reforming unit 5, the reforming raw material discharge pipe 15 may be connected to a pre-heating pipe 16. The pre-heating pipe 16 may surround an outer wall in a position having a possibility of being overheated in the reforming unit 5 to induce heat-exchange, whereby a temperature gradient of the reforming unit 5 may be adjusted. The pre-heating pipe 16 may not be limited in a winding position, the number of winding, and the like, as long as it can surround a side surface of the reforming unit 5 to conduct heat. Also, the pre-heating pipe 16 may be in direct contact with the reforming unit 5 or may be spaced apart therefrom.

Figure 5:
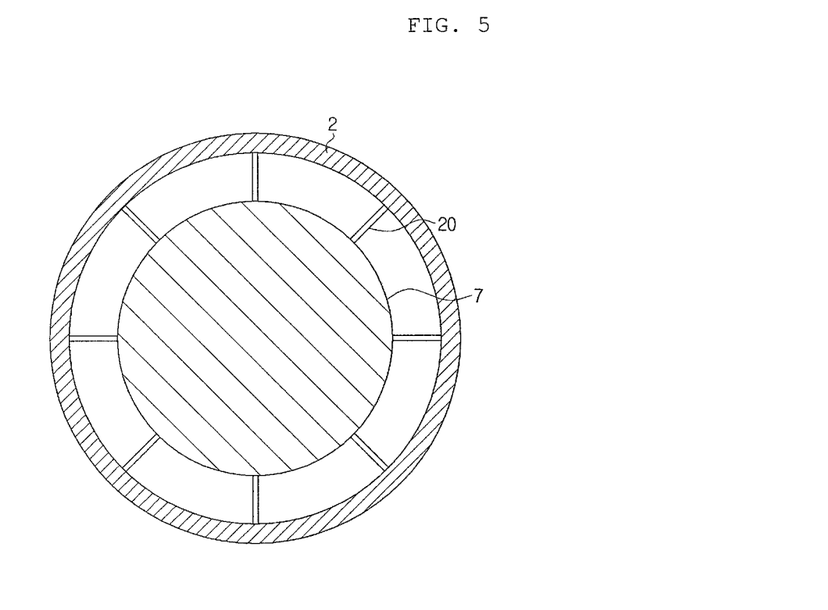
FIG. 5 is a cross-sectional view of a horizontal separator including a heating raw material transfer pipe and a reforming raw material phase change pipe.

Also, in order to further enhance heat efficiency by evenly transferring heat of the inside of the reforming unit 5, the reactor 1 according to the present invention may further include a heat transfer fin 20 in the reforming unit 5 as illustrated in FIG. 5. In the present invention, a position, a shape, a size, a material, and the like, of the heat transfer fin 20 are not limited but, preferably, the heat transfer fin 20 may be provided to connect the first housing 2 and the second housing 3 such that a flow of a raw material to be reformed is not interfered, and may be formed of the same material as that of the first housing 2 and the second housing 3.

In the descriptions of the drawing, it is described that the reforming unit 5 is formed by a space between the first housing 2 and the second housing 3 and filled with the reforming catalyst 6 and the burning unit 7 is formed by a space between the second housing 3 and the heating raw material transfer pipe 10 and filled with the combustion catalyst 8, but the reforming unit 5 and the burning unit 7 may be interchanged in position. That is, the reforming unit 5 may be formed by a space between the second housing 3 and the heating raw material transfer pipe 10 and positioned within the reactor, and the burning unit 7 may be formed by a space between the first housing 2 and the second housing 3 and may be in contact with the outside of the reactor 1 based on the first housing 2 as a boundary. This may be adjustable depending on a type of carbon compound included in a raw material, a type of reforming or combustion catalyst and a loaded metal, a heating value generated during combustion, and the like, and the present invention is not limited thereto.

Hereinafter, the present invention will be described in more detail on the basis of a fluid movement path.

The heating raw material flows by including:

a) an operation of transferring the raw material to be heated to the heating raw material transfer pipe 10 through the heating raw material supply pipe 12;

b) an operation of transferring the heated raw material from the heating raw material transfer pipe 10 to the burning unit 7 through the first compartment 17 and causing the heating raw material to react with the combustion catalyst 8 filling the burning unit 7 to perform catalyzed combustion; and c) an operation of discharging a combustion product to the outside of the reactor 1 through the combustion product discharge pipe 13 after catalyzed combustion.

The reforming raw material flows by including:

1) an operation of transferring the raw material to be reformed to the raw material phase change pipe 11 through the reforming raw material supply pipe 14 and subsequently changing a phase of the reforming raw material to a gas phase;

2) an operation of transferring the phase-changed raw material to the second compartment 18 through the reforming raw material discharge pipe 15 and the pre-heating pipe 16;

3) an operation of letting the raw material to be reformed supplied to the second compartment 18 to pass through the reforming unit 5 to react with the reforming catalyst 6 filling the reforming unit 5;

4) an operation of letting the reformed raw material to pass through the carbon monoxide removing catalytic layer of the carbon monoxide removing unit 9 at an end of the reforming unit 5 to perform a selective carbon monoxide removing reaction; and 5) an operation of discharging a reaction-finished product to the outside of the reactor 1 through the reformed generation gas discharge pipe 24.

First, the raw material to be reformed and the raw material to be heated may be stored in a raw material tank (not shown) and may have the same or different compositions. The raw materials may include 30 to 50 wt % of water and 50 to 70 wt % of a carbon compound, and the content of the carbon compound may be freely changed in a composition ratio according to a composition of a catalyst, a condition for adjusting a temperature gradient of the reforming unit, and the like.

In the present invention, the carbon compound may include alcohol, aldehyde, ketone, ester, and the like, used as an organic synthesis material, a solvent, a cleaning agent, and the like. Here, the alcohol may be a low-priced alcohol such as ethanol, butanol, and the like, as well as methanol, and, in addition, aldehyde such as formaldehyde, acetaldehyde, propionaldehyde, butyraldehyde, and the like, and ketone such as propanone, butanone, pentanone, and the like, may also be used. Since impurities such as carbon depositions, or the like, according to reforming are increased as the number of carbon atoms of the carbon compound is increased, an operation temperature should be precisely adjusted, and, more preferably, methanol is used.

Water is generally used as a solvent, and purified water may be used. Here, in order to save energy and increase a progress rate of a reaction, water may undergo pre-heating.

In the present invention, the raw material to be heated may be first transferred to the heating raw material transfer pipe 10 through the heating raw material supply pipe 12 as in the operations a) and b) so as to be injected into the reactor 1, and the injected raw material to be heated may be transferred to the burning unit 7 through the heating raw material transfer pipe 10 and the first compartment 17. That is, when the raw material to be heated passes through the heating raw material transfer pipe 10, the raw material to be heated enters from the upper end to the lower end, and when the raw material to be heated passes through the burning unit 7 through the first compartment 16, the heated raw material moves from the lower end of the burning unit 7 to the upper end thereof.

The catalyzed combustion is an oxidation reaction which occurs as adsorption, movement, and reaction of the heating raw material to a catalytic surface layer are performed complexly, and due to low activation energy, a combustion reaction may be advantageously stably performed at low temperatures. Also, combustion efficiency is high, and since a post-reaction product is decomposed to harmless and odorless carbon dioxide and oxygen, post-treatment such as wastewater treatment, or the like, is not necessary and an increase in a degradation rate of the combustion catalyst may be restrained.

The reaction-finished heated raw material may be converted into carbon dioxide and water and may be discharged to the outside of the reactor through the combustion product discharge pipe 13 as in operation c).

In the present invention, the raw material to be reformed may undergo operation 1) in which the raw material to be reformed is transferred to the raw material phase change pipe 11 through the reforming raw material supply pipe 14 and operation 2) in which the raw material to be reformed is subsequently changed in phase from a liquid phase to a gas phase.

In the present invention, the raw material to be reformed may be supplied as a liquid phase, or may be supplied as a gas phase according to a process and a structure of the reactor.

The phase-changed raw material to be reformed is discharged to the outside of the reactor through the reforming raw material discharge pipe 15, moves to the second compartment 18, is introduced to the reforming unit 5 through the punched guide plate 23, and subsequently undergoes operation 4). The reforming unit may convert the reformed raw material into hydrogen, carbon dioxide, carbon monoxide, methane, and the like, by the reforming catalyst 6.

A reaction of the raw material to be reformed and the reforming catalyst 6 is made as expressed by Reaction Formula 1 below, and (2) of Reaction Formula 1 may partially take place at high temperatures through a direct decomposition reaction of methanol.

[Reaction Formula 1]

$$CH_3OH+H_2O=CO_2+3H_2 \Delta H=49.4 \text{ kJ/mol} \quad (1)$$

$$CH_3OH=CO+2H_2 \Delta H=90.5 \text{ kJ/mol} \quad (2)$$

$$CO+H_2O=CO_2+H_2 \Delta H=-41.1 \text{ kJ/mol} \quad (3)$$

In operation 4), a temperature of the reforming catalyst stacked in the reforming unit 5 may range from 100° C. to 300° C. If the temperature is lower than 100° C., energy required for a reforming reaction may not be sufficiently received so a conversion rate to hydrogen may be drastically lowered, and if the temperature exceeds 300° C., the content of carbon monoxide in the product may be increased to make it difficult to remove carbon monoxide, and also, the reforming catalyst may be rapidly thermally denatured.

Before the reforming reaction-finished product is discharged to the outside of the reactor through the reformed generation gas discharge pipe 24, carbon monoxide may be removed. Here, a concentration of carbon monoxide within the reformed generation gas after removal of carbon monoxide is preferably 10 ppm or less.

In detail, in order to remove carbon monoxide contained in the product, a method for converting carbon monoxide into carbon dioxide or methane using selective carbon monoxide oxidation reaction or selective carbon monoxide methanation reaction in which the reaction may be made like Reaction Formula 3 or Reaction Formula 4.

$$CO+\tfrac{1}{2}O_2 \rightarrow CO_2 \quad \text{[Reaction Formula 3]}$$

As for Reaction Formula 3, air is supplied for oxygen to react with carbon monoxide and an effective carbon monoxide oxidation reaction is required to be induced through uniformly mixing a reformed gas and air. To this end, a flow channel structure for a selective oxidation reaction may be complicated and maintenance may be difficult.

Thus, the carbon monoxide removing unit preferably has a carbon monoxide removing catalyst to perform a selective carbon monoxide methanation reaction such as Reaction formula 4 below. However, the present invention is not limited to the selective carbon monoxide methanation reaction.

$$CO+3H_2 \rightarrow CH_4+H_2O \quad \text{[Reaction Formula 4]}$$

Hereinafter, the present invention will be described in more detail through an exemplary embodiment. However, the exemplary embodiment hereinafter is merely an example to describe the present invention in detail and the present invention is not limited thereto.

Example 1

The reforming unit was filled with a catalyst of a copper (Cu) component prepared in the form of a pellet having an average diameter of 1.5 mm, as a reforming catalyst, and the burning unit was filled with a platinum (Pt) catalyst prepared in the form of ceramic honeycomb. The reforming raw material phase change pipe surrounded in the form of a coil from a bottom, a lower end portion of the heating raw material transfer pipe, to a height (½ height of the reactor) filled with the combustion catalyst along an outer circumferential surface of the heating raw material transfer pipe using a ⅛" tube. Also, an end of the reforming unit was filled with alumina pellet having an average diameter of 1.5 mm without catalytic activity.

As a raw material, liquid fuel was prepared by mixing 60 wt % of methanol and 40 wt % of distilled water with respect to a mass and used. Also, as a raw material to be heated and modifying raw material, the same liquid fuel was used. As the raw material to be reformed, 12 g/min of liquid fuel was supplied. The raw material to be heated was supplied at a flow rate of 3.8 g/min and air was supplied together at a velocity of flow of 25 l/min for combustion, so that a maximum temperature of the reforming unit catalytic layer was adjusted to be maintained at 320° C. or lower. Here, a composition of the reformed product was analyzed by gas chromatography and described in Table 1. In Example 1, the content of carbon monoxide was 0.95%, a methanol conversion rate calculated by carbon amount preservation formula was achieved by 97%, and a produced hydrogen amount was calculated to 0.87 Nm³/h.

Comparative Example 1

The same process was performed in the same manner as that of Example 1, except that a position of the reforming raw material phase change pipe was different, that is, the reforming raw material phase change pipe surrounded in a coil form using a ⅛" tube along an outer circumferential surface of the heating raw material transfer pipe in an upward direction from a height of a portion, i.e., an upper end portion of the heating raw material transfer pipe not filled with the combustion catalyst.

As can be seen from Table 1 below, compared with Comparative Example 1, in Example 1 in which a position of the reforming raw material phase change pipe was adjusted from an upper end portion of the heating raw material transfer pipe to a lower end portion thereof, a methanol conversion rate was increased from 92% to 97% with respect to the same raw material supply amount and reforming efficiency was increased from 80% to 85%. Also, a produced hydrogen flow rate was increased from 0.81 Nm³/h to 0.87 Nm³/h.

In the case of Example 1, since the reforming raw material phase change pipe is positioned at the lower end portion at the same level as that of the combustion catalyst to directly heat-exchange with a high temperature combustion catalyst, a sufficiently evaporated raw material is introduced to the reforming catalytic layer, whereas, in the case of Comparative Example 1, since the reforming raw material phase change pipe is separately positioned at the rear end of the combustion catalyst and heat-exchanged with a combustion flue gas discharged from the combustion catalyst, rather than directly heat-exchanging with the combustion catalyst, a non-uniformly evaporated reforming raw material is introduced to the reforming catalytic layer, significantly lowering a methanol conversion rate and reforming efficiency, compared with Example 1.

TABLE 1

| Classification | | Example 1 | Comparative Example 1 |
|---|---|---|---|
| Composition of reforming gas (dry basis) | Hydrogen (%) | 74.8 | 74.6 |
| | Carbon dioxide (%) | 23.9 | 22.7 |
| | Methane (%) | 0 | 0 |
| | Carbon monoxide (%) | 0.95 | 2.7 |
| Methanol conversion rate (%) | | 97 | 92 |
| Reforming efficiency (%, based on lower heating value) | | 85 | 80 |
| Produced hydrogen flow rate (Nm³/h) | | 0.87 | 0.81 |

Example 2

The reforming unit was filled with a catalyst of a copper (Cu) component prepared in the form of a pellet having an average diameter of 1.5 mm, as a reforming catalyst, and the burning unit was filled with a platinum (Pt) catalyst prepared in the form of ceramic honeycomb. The reforming raw material phase change pipe surrounded in the form of a coil from a bottom, a lower end portion of the heating raw material transfer pipe, to a height (½ height of the reactor) filled with the combustion catalyst along an outer circumferential surface of the heating raw material transfer pipe using a ⅛" tube. Also, an end of the reforming unit was filled with a catalyst of a ruthenium (Ru) component prepared in the form of pallet having an average diameter of 1.5 mm to remove carbon monoxide.

As a raw material, liquid fuel was prepared by mixing 60 wt % of methanol and 40 wt % of distilled water with respect to a mass and used. Also, as a raw material to be heated and raw material to be reformed, the same liquid fuel was used. As the raw material to be reformed, 15.6 g/min of liquid fuel was supplied. The raw material to be heated was supplied at a flow rate of 4.7 g/min and air was supplied together at a velocity of flow of 30 l/min for combustion, so that a maximum temperature of the reforming unit catalytic layer was adjusted to be maintained at 280° C. or lower. Here, a composition of the reformed product was analyzed by gas chromatography and described in Table 2. The content of carbon monoxide was 10 ppm or less, a methanol conversion rate calculated by carbon amount preservation formula was achieved by 100%, reforming efficiency was 79%, and a produced hydrogen amount was calculated to 1.1 Nm³/h.

TABLE 2

| Classification | | Example 2 |
|---|---|---|
| Composition of reforming gas (Dry basis) | Hydrogen (%) | 71 |
| | Carbon dioxide (%) | 24.6 |
| | Methane (%) | 4 |
| | Carbon monoxide (ppm) | 10 or less |
| Methanol conversion rate (%) | | 100% |
| Reforming efficiency (%, based on lower heating value) | | 79 |
| Produced hydrogen flow rate (Nm³/h) | | 1.1 |

Although the exemplary embodiments of the present invention have been described, the present invention can cover a variety of changes and modifications and equivalents and it is clear that the exemplary embodiments may be appropriately modified to be equally applied. Thus, the above descriptions are not intended to limit the scope of the invention as defined by the limitations of the claims.

What is claimed is:

1. A hydrogen production reactor as a reactor producing a reformed as including hydrogen from a raw material containing a carbon compound and water, in which a burning unit and a reforming unit are sequentially arranged and spaced apart from each other in a concentric structure based on a raw material transfer pipe positioned at a central axis of the reactor, the hydrogen production reactor comprising:
a heating raw material transfer pipe supplying a raw material to the burning unit;
the burning unit burning a first supplied raw material and supplying heat to the reforming unit;
a reforming raw material phase change pipe positioned within the burning unit and heating a second supplied raw material to make a phase-changed raw material; and
the reforming unit reforming the phase-changed raw material supplied from the reforming raw material phase change pipe,
wherein the reforming raw material phase change pipe is provided as a coil surrounding an outer circumferential surface of a lower end of the heating raw material transfer pipe; and a horizontal separator provided at an upper end of the heating raw material transfer pipe and separating the heating raw material transfer pipe from the outside; and wherein a reforming raw material supply pipe, and a reforming raw material discharge pipe penetrate through the horizontal separator, such that the reforming raw material supply pipe and the reforming raw material discharge pipe are directly connected to one end and the other end of the reforming raw material phase change pipe, respectively.

2. The hydrogen production reactor of claim 1, wherein the reforming unit has, at an end thereof, a carbon monoxide removing unit filled with a carbon monoxide removing catalyst for removing carbon monoxide from a material that was reformed from the reforming unit.

3. The hydrogen production reactor of claim 2, wherein the carbon monoxide removing catalyst includes one or more metals selected from among gold, silver, iron, cobalt, nickel, copper, manganese, aluminum, zinc, titanium, hafnium, rhodium, ruthenium, osmium, iridium, palladium, platinum, zirconium, and lanthanide metals, or an oxide thereof.

4. The hydrogen production reactor of claim 1, wherein a first housing, a second housing, and the heating raw material transfer pipe are sequentially positioned and spaced apart from each other from an outer side in a concentric structure, and the reforming unit provided in a space between the first housing and the second housing, the second housing has a reforming catalyst, and the burning unit provided in a space between the second housing and the heating raw material transfer pipe has a combustion catalyst.

5. The hydrogen production reactor of claim 1, wherein a lower end of the heating raw material transfer pipe and a lower end of a second housing are spaced apart from each other to form a first compartment, and the lower end of the second housing and a lower end of the first housing are spaced apart from each other to form a second compartment.

6. The hydrogen production reactor of claim 5, wherein a combustion catalyst and a reforming catalyst independently include one or more metals selected from among gold, silver, iron, cobalt, nickel, copper, manganese, aluminum, zinc, titanium, hafnium, rhodium, ruthenium, osmium, iridium, palladium, platinum, zirconium, and lanthanide metals, or an oxide thereof.

7. The hydrogen production reactor of claim 6, wherein the reforming catalyst includes one or more selected from among a copper/cerium oxide/zirconium oxide complex, a copper/zinc oxide/aluminum oxide complex, a copper/cerium oxide/aluminum oxide complex, and a copper/zirconium oxide/aluminum oxide complex.

8. The hydrogen production reactor of claim 1, further comprising: wherein the horizontal separator provided at the upper end of the heating raw material transfer pipe separates a first housing, and a second housing from the outside.

9. The hydrogen production reactor of claim 8, wherein the horizontal separator is provided such that a heating raw material supply pipe, and a combustion product discharge pipe penetrate therethrough.

10. The hydrogen production reactor of claim 9, wherein the heating raw material supply pipe is connected to the heating raw material transfer pipe, and the combustion product discharge pipe is connected to the burning unit.

11. The hydrogen production reactor of claim 9, wherein the reforming raw material discharge pipe is connected to the second compartment.

12. The hydrogen production reactor of claim 9, wherein the reforming raw material discharge pipe is connected to a pre-heating pipe and the pre-heating pipe surrounds in a coil form an outer circumferential surface of the first housing.

13. The hydrogen production reactor of claim 1, wherein a first housing includes at least one temperature measurement sensor provided in a portion of an outer circumferential surface thereof filled with a reforming catalyst.

14. The hydrogen production reactor of claim 1, wherein the burning unit further includes a heat conduction mesh in a space not filled with a combustion catalyst.

15. The hydrogen production reactor of claim 1, wherein the reforming unit further includes at least one heat transfer fin.

16. The hydrogen production reactor of claim 1, wherein the raw material is stored in a raw material tank and includes the first raw material to be heated supplied from the raw material tank to the heating raw material supply pipe and the second raw material to be reformed supplied from the raw material tank to the reforming raw material supply pipe.

17. A method for producing hydrogen using the hydrogen production reactor of claim 16, wherein
a raw material to be heated flows by including:
a) an operation of transferring the raw material to be heated to the heating raw material transfer pipe through the heating raw material supply pipe;
b) an operation of transferring the raw material to be heated from the heating raw material transfer pipe to the burning unit through a first compartment and causing the heated raw material to react with the combustion catalyst filling the burning unit to perform catalyzed combustion; and
c) an operation of discharging a combustion product to the outside of the reactor through the combustion product discharge pipe after catalyzed combustion, and
a raw material to be reformed flows by including:
1) an operation of transferring the raw material to be reformed to the reforming raw material phase change pipe through the reforming raw material supply pipe and subsequently changing a phase of the reforming raw material to a gas phase;
2) an operation of transferring the phase-changed reforming raw material to a second compartment through the reforming raw material discharge pipe and the pre-heating pipe;
3) an operation of letting the raw material to be reformed supplied to the second compartment to pass through the reforming unit to react with the reforming catalyst filling the reforming unit;
4) an operation of letting the reformed raw material to pass through a carbon monoxide removing catalytic layer of the carbon monoxide removing unit at an end of the reforming unit to selectively remove carbon monoxide; and
5) an operation of discharging a reaction-finished product to the outside of the reactor.

18. The method of claim 17, wherein the raw material to be heated or the raw material to be reformed includes 30 to 50 wt % of water and 50 to 70 wt % of a carbon compound.

19. The method of claim 17, wherein, in the operation 3), the reforming catalyst has a temperature range of 100° C. to 300° C.

20. The method of claim 17, wherein, in the operation 4), the carbon monoxide removing catalytic layer has a temperature range of 200° C. to 300° C.

* * * * *